United States Patent [19]
Hatakeyama et al.

[11] Patent Number: 6,018,407
[45] Date of Patent: Jan. 25, 2000

[54] OPTICAL RECEIVING CIRCUIT

[75] Inventors: Ichiro Hatakeyama; Takeshi Nagahori, both of Tokyo, Japan

[73] Assignee: NEC Corporation, Japan

[21] Appl. No.: 08/859,205

[22] Filed: May 20, 1997

[30] Foreign Application Priority Data

May 20, 1996 [JP] Japan .................................. 8-124628

[51] Int. Cl.$^7$ .................................. H04B 10/00
[52] U.S. Cl. ...................... 359/189; 327/309; 375/317
[58] Field of Search .................... 359/189, 161; 375/317, 318; 455/296; 327/309, 323; 330/75, 98, 99

[56] References Cited

U.S. PATENT DOCUMENTS 5,475,342 12/1995 Nakamura et al. .................. 375/317 X
5,612,810 3/1997 Inami et al. .............................. 359/189

FOREIGN PATENT DOCUMENTS 310967 11/1994 Japan .

OTHER PUBLICATIONS

N. Ishihara, et al., "3V, 156Mb/s–Si bipolar Instantaneous Response Limiting Amplifier IC", 1996 Institute of Electronics, Information and Communication Engineers General Convention, C–588.

M. Nakamura, et al., "A Wide–Dynamic–Range and Extremely High–sensitivity CMOS Optical Receiver IC using Feed–Forward Auto–Bias Adjustment", *The Institute of Electronics, Information and Communication Engineers*, 1994.

N. Ishihara, et al., "WP 2.2: 3.5Gb/s× 4–Ch Si Bipolar LSis for Optical Interconnections", IEEE International Solid–State Circuits Conference, 1995.

N. Ishihara, et al., "Low–power, 156–Mb/s ICs for Optical Receiver Using Non–triming Circuit Technique", SC–9–7, 1995.

*Primary Examiner*—Thomas Mullen
*Attorney, Agent, or Firm*—Ostrolenk, Faber, Gerb & Soffen, LLP

[57] ABSTRACT

An optical receiving circuit comprising a plurality of amplifying circuits successively connected in a multiple stage form, each of the plurality of amplifying circuits having an offset compensating function. The optical receiving circuit includes offset compensating circuits respectively arranged in the plurality of amplifying circuits. Time constants of the offset compensating circuits are set in such a manner that the time constant of an offset compensating circuit arranged at one stage is smaller than that of an offset compensating circuit arranged at the previous stage.

11 Claims, 7 Drawing Sheets

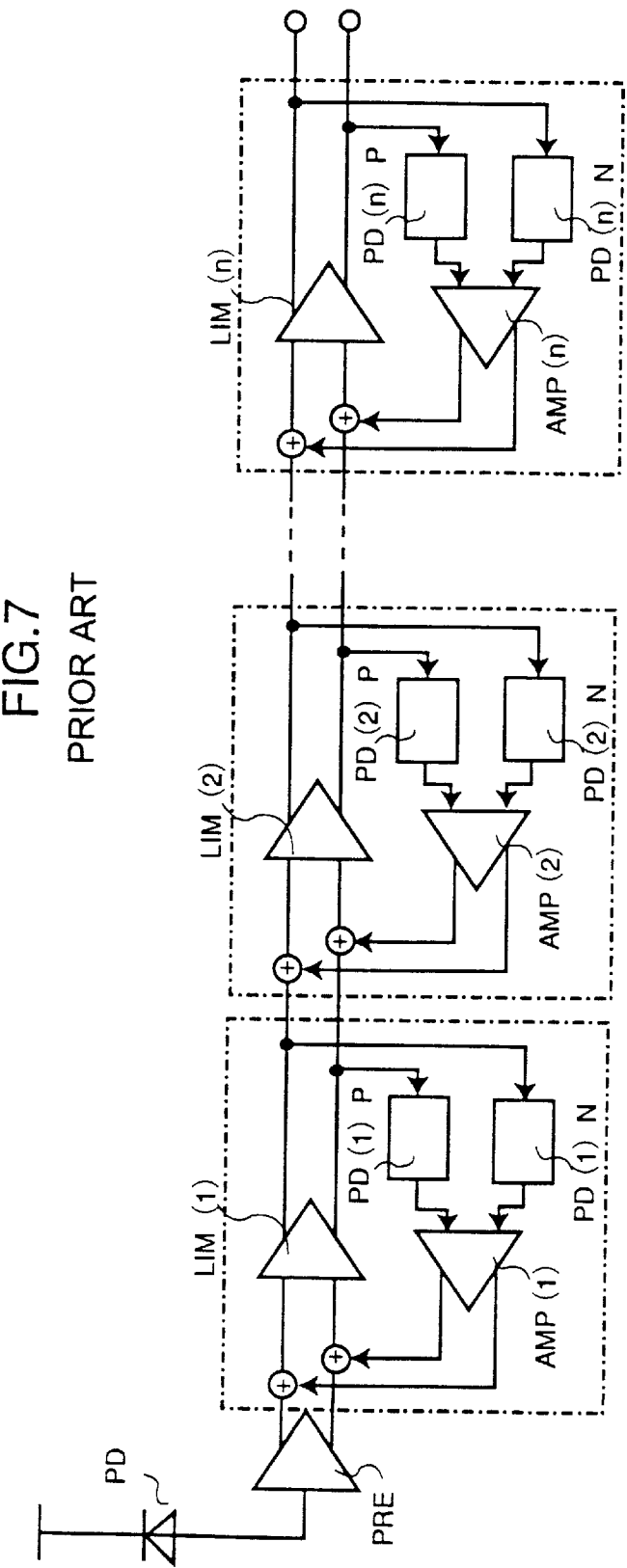

OPTICAL RECEIVING CIRCUIT

BACKGROUND OF THE INVENTION

The present invention relates to an optical receiving circuit used in optical access systems, optical data links, optical interconnections, and similar systems, and more particularly to an optical receiving circuit having amplifying circuits configured in a multistage form each of which amplifies received digital signals.

An optical receiving circuit of that type includes an amplifying circuit system which consists of amplifying circuits successively connected in a multistage form to amplify received digital signals to a predetermined gain level. In many cases, since received digital signals with unipolar codes are converted into amplified signals with bipolar codes, respective amplifying circuits are formed of differential amplifiers. For that reason, the optical receiving circuit with amplifying circuits of that type requires a circuit that compensates for an offset between the positive-phase output and the negative-phase output of an amplifying circuit. FIG. 6 illustrates a conventional optical receiving circuit that can realize the offset compensation. Referring to FIG. 6, a preamplifier PRE amplifies a signal received with a light receiving element PD. Then differential amplifiers DAMP(1) to DAMP(n) serially connected in n stages (where n is an integer of 1 or more) further amplify the amplified signal successively. Offset compensation is performed by detecting an average value or peak level of a positive-phase output from the differential amplifier at the last stage and an average value or peak level of a negative-phase output therefrom by means of a detector PD, and then feeding the differential outputs from the feedback differential amplifier DAMPO, which receives the detected values, back to the inputs of the first-stage differential amplifier.

However, this circuit configuration requires arranging a feedback loop ranging from the output terminal of the last-stage amplifier to the input terminal of the first-stage amplifier in n-stage differential amplifiers connected in a multistage form. Hence, when the optical receiving circuit is fabricated in an integrated circuit form, the feedback loop becomes large sized upon IC circuit layout design. Consequently, a problem arises that the circuit configuration is not suitable for one-chip IC fabrication because it tends to be susceptible to interference at some midpoint in the feedback loop.

To solve such a problem, the circuit configuration shown in FIG. 7 has been proposed. In the optical receiving circuit, n-stage limiter amplifiers LIM(1) to LIM(n), which are successively connected to a photo diode PD and a preamplifier PRE, implement offset compensation, respectively. The peak level detector PD(L)P detects the peak level of a positive-phase output signal of the limiter amplifier LIM(1) while the peak level detector PD(1)N detects the peak level of an negative-phase output signal of the limiter amplifier LIM(1). The peak level detector PD(2)P detects the peak level of a positive-phase output signal of the limiter amplifier LIM(2) while the peak level detector PD(2)N detects the peak level of a negative-phase output signal of the limiter amplifier LIM(2). The peak level detector PD(n)P detects the peak level of a positive-phase output signal of the limiter amplifier LIM(n) while the peak level detector PD(n)N detects the peak level of a negative-phase output signal of the limiter amplifier LIM(n). The differential output signals of the feedback differential amplifier AMP(1) are respectively fed back to the inputs of the limiter amplifier LIM(1). The differential output signals of the feedback differential amplifier AMP(2) are respectively fed back to the inputs of the limiter amplifier LIM(2). The differential output signals of the feedback differential amplifier AMP(n) are respectively fed back to the inputs of the limiter amplifier LIM(n). In such an operation, offsets of the limiter amplifiers are compensated respectively. This circuit is disclosed in JP-A-310967/1994 and the 1996 Institute of Electronics, Information and Communication Engineers General Convention C-588.

Since a feedback loop for an offset compensating circuit is arranged in each amplifier, the circuit shown in FIG. 7 does not require the feedback loop ranging from the first-stage amplifier to the last stage amplifier as shown in the circuit of FIG. 6. Hence, the circuit configuration has a small circuit scale and can be realized as a one-chip IC. However, in the circuit shown in FIG. 7, time constants for compensation of offset compensating circuits arranged in amplifiers at all stages are set equally and to a small value, respectively, to realize high-speed operation. As a result, the amplifier in each stage can compensate offset compensation instantaneously. However, because the compensation time constant for offset compensation function at each stage is small, the offset compensating circuit at each stage responds sensitively and tends to pick up EMI (electromagnetic interference). Therefore there has been the problem that the stability and reliability of output characteristics decrease.

SUMMARY OF THE INVENTION

The objective of the present invention is to solve the above-mentioned tasks.

Moreover, the objective of the invention is to provide an optical receiving circuit that can obtain its output characteristics with excellent stability and reliability by preventing the above-mentioned interference.

The objective of the present invention is achieved by an optical receiving circuit including offset compensating circuits respectively arranged in a plurality of amplifying circuits successively connected in a multistage form, in which the time constant of each of the offset compensating circuits is set in such a manner that the time constant of an offset compensating circuit in an amplifying circuit at a rear stage is smaller than that of an offset compensating circuit in an amplifying circuit at a previous stage.

For example, according to a preferred embodiment of the present invention, the offset compensating circuit includes a circuit for detecting a peak level of a positive-phase output signal from an-amplifying circuit at each stage and a circuit for detecting a peak level of a negative-phase output signal therefrom. The offset compensating circuit performs a feedback operation to equalize the peak levels detected. The time constant of each of the peak detecting circuits is set in such a manner that the time constant of a peak level detecting circuit in an amplifying circuit at a rear stage is smaller than that of a peak level detecting circuit in an amplifying circuit at a previous stage.

In another aspect, the offset compensating circuit includes a circuit for detecting an average value of a positive-phase output signal and an average value of a negative-phase output signal from an amplifying circuit at each stage. The offset compensating circuit performs a feedback operation to equalize the average value detected. The time constant of the average value detecting circuit is set in such a manner that the time constant of an average detecting circuit in an amplifying circuit at a rear stage is smaller than that of an average detecting circuit in an amplifying circuit at a previous stage.

Furthermore, the offset compensating circuit includes a circuit for detecting a peak level of a positive-phase output signal from an amplifying circuit at a previous stage and a circuit for detecting a peak level of a negative-phase output signal therefrom. The offset compensating circuit adds the detected peak level of the positive-phase output signal to a negative-phase input of an amplifying circuit at a stage including the offset compensating circuit and adds the detected peak level of the negative-phase output signal to a positive-phase input of an amplifying circuit at the stage including the offset compensating circuit. The time constant of each of the peak level detecting circuits is set in such a manner that the time constant of a peak level detecting circuit in an amplifying circuit at a rear stage is smaller than that of a peak level detecting circuit in an amplifying circuit at a previous stage.

Moreover, the offset compensating circuit includes a circuit for detecting a peak level of an output signal from an amplifying circuit at a previous stage and a circuit for detecting a bottom level of an output signal therefrom. The compensating circuit differentially amplifies an intermediate value of the peak level and the bottom level detected as a reference input for an amplifying circuit at a stage including the offset compensating circuit. The time constant of the peak level detecting circuit is set in such a manner that the time constant in an amplifying circuit at a rear stage is smaller than that in an amplifying circuit at a previous stage. The time constant of the bottom level detecting circuit is set in such a manner that the time constant in an amplifying circuit at a rear stage is smaller than that in an amplifying circuit at a previous stage.

In another aspect, an optical receiving circuit comprises a photo diode for converting an input optical signal into an electrical signal; and a plurality of amplifying circuits successively connected in a multistage for converting the electrical signal converted by the photo diode into bipolar codes. The plurality of amplifying circuits respectively includes an amplifier and an offset compensating circuit. The offset compensating circuit includes a first peak level detecting circuit for detecting a peak level of a positive-phase output signal from the amplifier; a second peak level detecting circuit for detecting a peak level of a negative-phase output signal from the amplifier; and a differential amplifier for feeding a differential output signal of the peak level detected by the first peak level detecting circuit back to a positive-phase input and for feeding a differential output signal of the peak level detected by the second peak level detecting circuit back to a negative-phase input.

In the time constant at each stage, the time constant of an offset compensating circuit arranged at a previous stage is larger than the time constant of an offset compensating circuit arranged at a rear stage.

In still another aspect, an optical receiving circuit comprises a photo diode for converting an input optical signal into an electrical signal; and a plurality of amplifying circuits successively connected in a multistage for converting the electrical signal converted by the photo diode into bipolar codes. The plurality of amplifying circuits respectively includes an amplifier and an offset compensating circuit. The offset compensating circuit includes an average value detecting circuit for detecting a first average value of a positive-phase output signal from the amplifier and a second average value of a negative-phase output signal from the amplifier; and a differential amplifier for controlling the amplifier using the first and second average value.

In the time constant at each stage, the time constant of an offset compensating circuit arranged at a previous stage is larger than the time constant of an offset compensating circuit arranged at a rear stage.

In still another aspect, an optical receiving circuit comprises a photo diode for converting an input optical signal into an electrical signal; and a plurality of amplifying circuits successively connected in a multistage for converting the electrical signal converted by the photo diode into bipolar codes. The plurality of amplifying circuits respectively includes an amplifier and an offset compensating circuit. The offset compensating circuit includes a first peak level detecting circuit for detecting a peak level of a positive-phase output signal to add the detected peak level to a negative-phase output signal to the amplifier; and a second peak level detecting circuit for detecting a peak level of a negative-phase output signal to add the detected peak level to a positive-phase output signal to the amplifier.

In the time constant at each stage, the time constant of an offset compensating circuit arranged at a previous stage is larger than the time constant of an offset compensating circuit arranged at a rear stage.

In a further aspect, an optical receiving circuit comprises a photo diode for converting an input optical signal into an electrical signal; and a plurality of amplifying circuits successively connected in a multistage for amplifying a unipolar receive digital signal from the photo diode. The plurality of amplifying circuits respectively includes a limiter amplifier and an offset compensating circuit. The offset compensating circuit includes a peak level detecting circuit for detecting a peak level of an output signal to the amplifier; a bottom level detecting circuit for detecting a bottom level of the output signal to the amplifier; and a resistance voltage divider for dividing the output signal from the peak level detecting circuit and the output signal from the bottom level detecting signal to supply an intermediate value as a reference to the limiter amplifier.

The time constant of a peak level detecting circuit arranged at a previous stage is larger than the time constant of a peak level detecting circuit arranged at a rear stage. The time constant of a bottom level detecting circuit arranged at a previous stage is larger than the time constant of a bottom level detecting circuit arranged at a rear stage.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

This and other objects, features and advantages of the present invention will become more apparent upon a reading of the following detailed description and drawings, in which:

FIG. 7 is a block circuit diagram showing a conventional improved optical receiving circuit.

DESCRIPTION OF THE EMBODIMENTS

Figure 1:
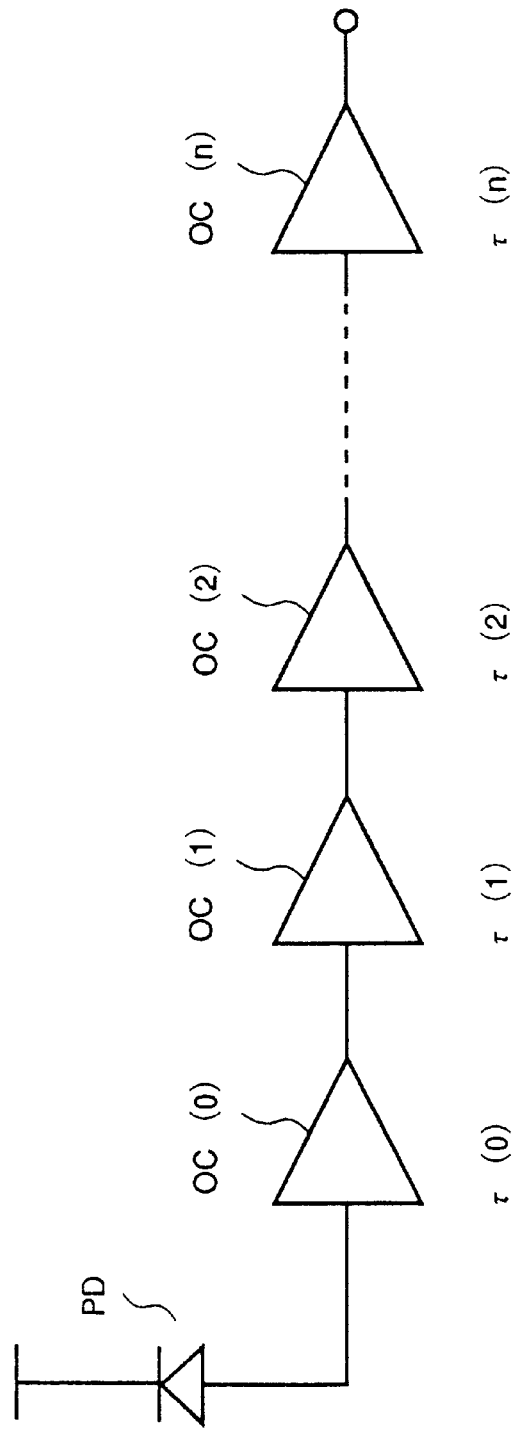
FIG. 1 is a block diagram showing the conceptual configuration of an optical receiving circuit according to the present invention.

Next, embodiments according to the present invention will now be described below with reference to the attached drawings. FIG. 1 is a block diagram illustrating the conceptual configuration of the present invention.

The optical receiving circuit consists of a photo diode PD that converts an input light signal into a current, and an amplifying circuit system formed of (n+1) stage limiter amplifying circuits OC(i) [where i=0, 1, . . . , n: this rule is applicable below] with offset compensation function which are successively connected at the rear stage of the photo diode PD. The electrical signal photoelectrically converted by the photo diode PD is a unipolar signal. The amplifying circuit system at the rear stage converts the unipolar signal into a bipolar code. The offset compensating time constant τ (i') of each limiter amplifying circuit OC(i) with offset control function is set so as to have the relation of τ (i')>T (i'+1) [where i'=0, 1, 2, . . . , n−1: this rule is applicable below], that is, in such a manner that the time constant of a limiter amplifying circuit arranged at a following stage is smaller than that of a limiter amplifying circuit arranged at the previous stage. In the circuit configuration shown in FIG. 1, the first-stage amplifying circuit OC(0) has the largest time constant. The time constants of the successive amplifying circuits decrease stage by stage. The last-stage amplifying circuit OC(n) has the smallest time constant.

According to the circuit configuration, the residue offset which cannot be sufficiently compensated by an offset compensating circuit arranged in a previous stage can be compensated by the offset compensating circuit arranged at the following stage. Hence, in the first-stage amplifying circuit OC(0) which receives the smallest signal levels and is susceptible to interference induced in an IC circuit internally or externally, even if the offset compensating circuit operates erroneously due to EMI, causing incomplete offset compensation, the offset compensating circuit with a smaller time constant in an amplifying circuit at the following stage performs offset compensation instantaneously. This operation improves the instability of compensation operation due to interference and realizes output characteristics with good stability and reliability. By the way, if the time constant of a previous-stage amplifying circuit and the time constant of a following-stage amplifying circuit are reversely set in value, offset compensation at the following stages consumes much time, thus easily causing burst errors. Moreover, since offset compensating circuits arranged more previously respond sensitively, they tend to be susceptible to interference.

Figure 2:
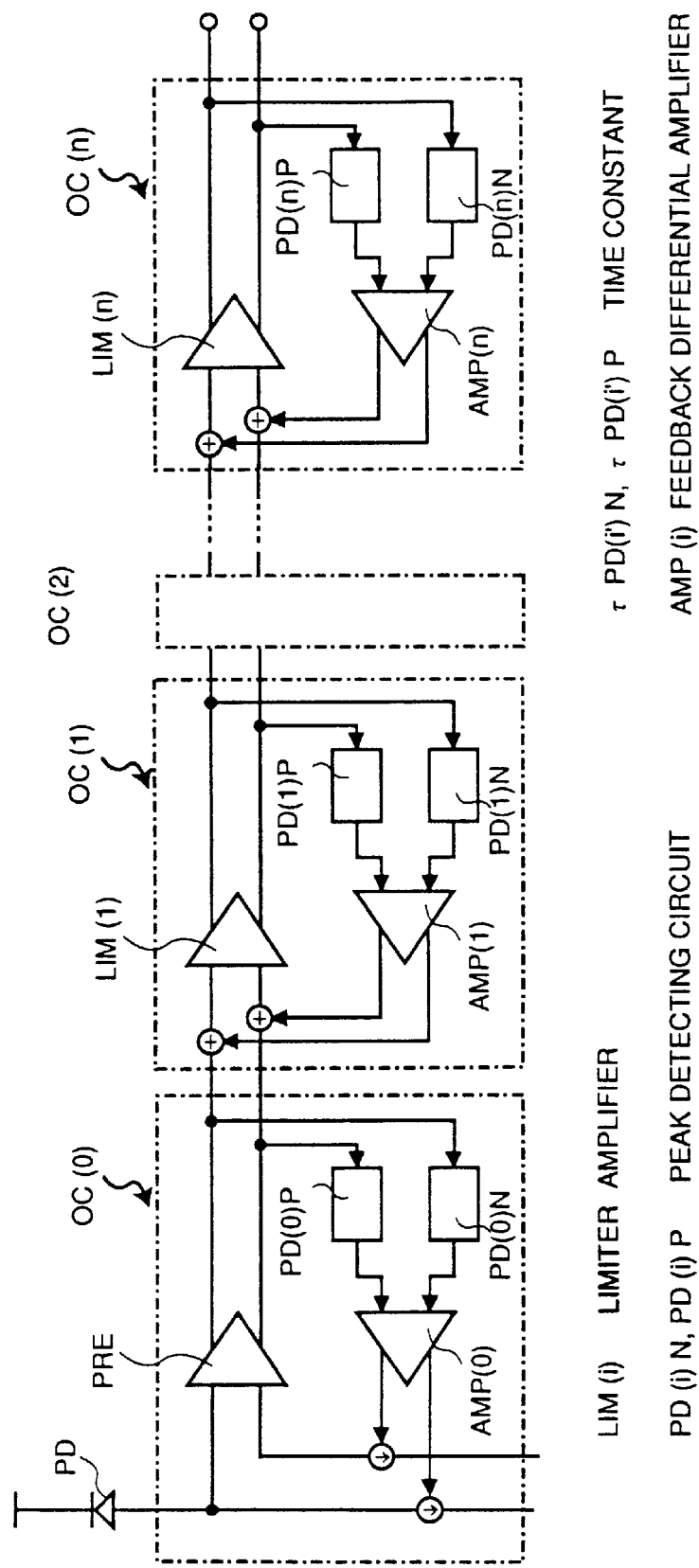
FIG. 2 is a block circuit diagram showing an optical receiving circuit according to a first embodiment of the present invention.

FIG. 2 is a block circuit diagram showing an optical receiving circuit according to a first embodiment of the present invention. Referring to FIG. 2, elements corresponding to those in FIG. 1 are designated with the same symbols. Each of the (n+1)-stage amplifying circuits OC(i) with offset compensation function consists of a differential amplification-type limiter amplifier LIM(i) acting as an amplifier. The first-stage amplifying circuit OC(0) (i=0) is formed as a preamplifier PRE. In each of amplifying circuits OC(i), the offset compensating circuit is formed of a peak level detecting circuit PD(i)P which detects the peak level of a positive-phase output signal from each limiter amplifier LIM(i) or, in the case of the first-stage amplifying circuit OC(0), the preamplifier PRE, a peak level detecting circuit PD(i)N which detects the peak level of a negative-phase output signal from each limiter amplifier LIM(i), or the preamplifier PRE in stage OC(0) and a differential amplifier AMP(i) which respectively feeds differential output signals of peak levels detected by the peak level detecting circuits back to the positive-phase input and the negative-phase input of a limiter amplifier LIM(i) or the preamplifier PRE. In the offset compensating circuit in each stage, time constants τPD(i')P and τPD(i')N of the peak level detecting circuits are respectively set to values larger than the time constants of the peak level detecting circuits arranged in the immediate following stage. The first-stage amplifying circuit has the largest time constant. The last-stage amplifying circuit has the smallest time constant. That is, an inequality of τPD(i')P>τPD(i'+1)P and an equality of τPD(i')N>τPD(i'+1)N are held.

Therefore, in order to achieve offset compensation by the amplifying circuit OC(i) in each stage, the peak level detecting circuit PD(i)P detects the peak level of a positive-phase output signal of the limiter amplifier LIM(i) and the peak level detecting circuit PD(i)N detects the peak level of a negative-phase output signal thereof. Then the feedback differential amplifier AMP(i) controls the level of the positive-phase input signal and the level of the negative-phase input signal in a feedback mode to equalize the peak levels. In this offset compensation, the time constant τPD(i')P of the peak level detecting circuit PD(i)P in an amplifying circuit at a previous stage is larger than the time constant τPD(i'+1)P of the peak level detecting circuit in PD(i)P an amplifying circuit at a following stage. The time constant τPD(i')N of the peak level detecting circuit PD(i)P in an amplifying circuit at a previous stage is larger than the time constant τPD(i'+1)N of the peak level detecting circuit PD(i)P in an amplifying circuit at a following stage. Hence, in the amplifying circuit at the previous stage, offset compensation is gradually performed. In the amplifying circuit at the following stage, offset compensation is performed at a higher rate. Hence, in the first amplifying circuit OC(0), even if the offset compensating circuit operates erroneously due to EMI or the like, thus causing an incomplete offset compensation, the offset compensating circuit in an amplifying circuit at the following stage completes the offset compensation instantaneously. This operation can improve an unstable compensation operation to an output from the last-stage amplifying circuit OC(n) and can realize output characteristics with excellent stability and reliability.

Figure 3:
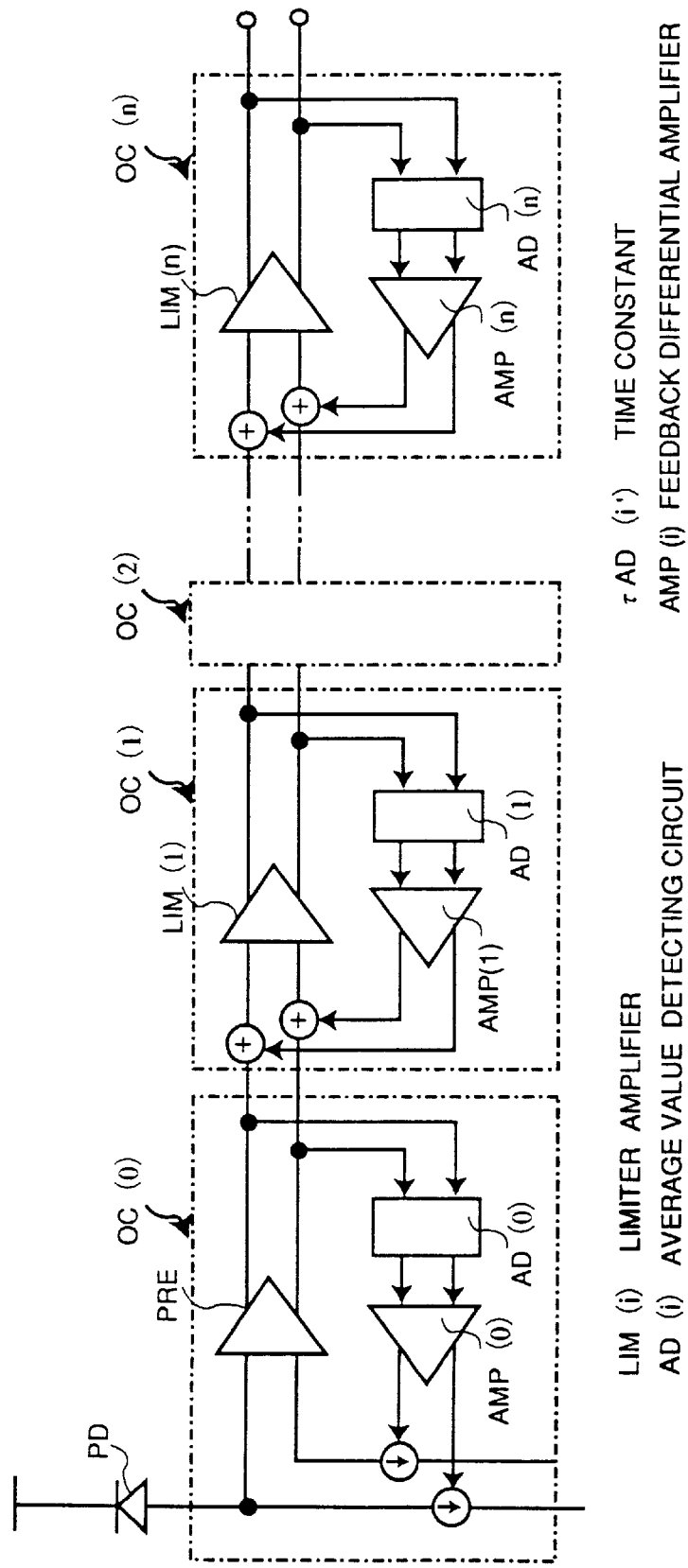
FIG. 3 is a block circuit diagram showing an optical receiving circuit according to a second embodiment of the present invention.

FIG. 3 is a block diagram illustrating an optical receiving circuit according to the second embodiment of the present invention. Elements corresponding to those shown in FIGS. 1 and 2 are designated with the same symbols. An average value detecting circuit AD(i) that detects the average value of a positive-phase output signal and the average value of a negative-phase output signal from the limiter amplifying circuit LIM(i) is employed as an offset compensating circuit operated for the limiter amplifier LIM(i) arranged in an amplifying circuit at each stage. In order to establish offset compensation, the feedback differential amplifier AMP(i) controls respective signals input to the limiter amplifying circuit LIM(i) using the averaged output signals. Regarding the time constant τAD(i')N of the average value detecting circuit AD(i), the time constant of an amplifying circuit at the previous stage is set to a value larger than that of an amplifying circuit at the following stage. That is, τAD(i') >τAD(i'+1).

In the amplifying circuit OC(i) at each stage according to the second embodiment, in order to achieve offset compensation, the average value detecting circuit AD(i) detects the average value of a positive-phase output signal and the average value of a negative-phase output signal from each limiter amplifier LIM(i). Then the feedback differential amplifier AMP(i) performs a feedback control to set respectively the level of a positive-phase input signal and the level of a negative-phase input signal to an average value. In this offset compensation, the time constant of the average value detecting circuit in an amplifying circuit at the previous stage is larger than that of the amplifying circuit at the following stage. Consequently, the offset is slowly compensated at the previous stage but is compensated faster at the following stage. As a result, even when offset compensation becomes incomplete in the offset compensating circuit in the first-stage amplifying circuit, the offset compensating circuit in the amplifying circuit at the following stage can perform an offset compensating operation instantaneously. An unstable compensation operation to output signals from the last-stage amplifying circuit is improved so that the output characteristics with good stability and reliability can be obtained.

Figure 4:
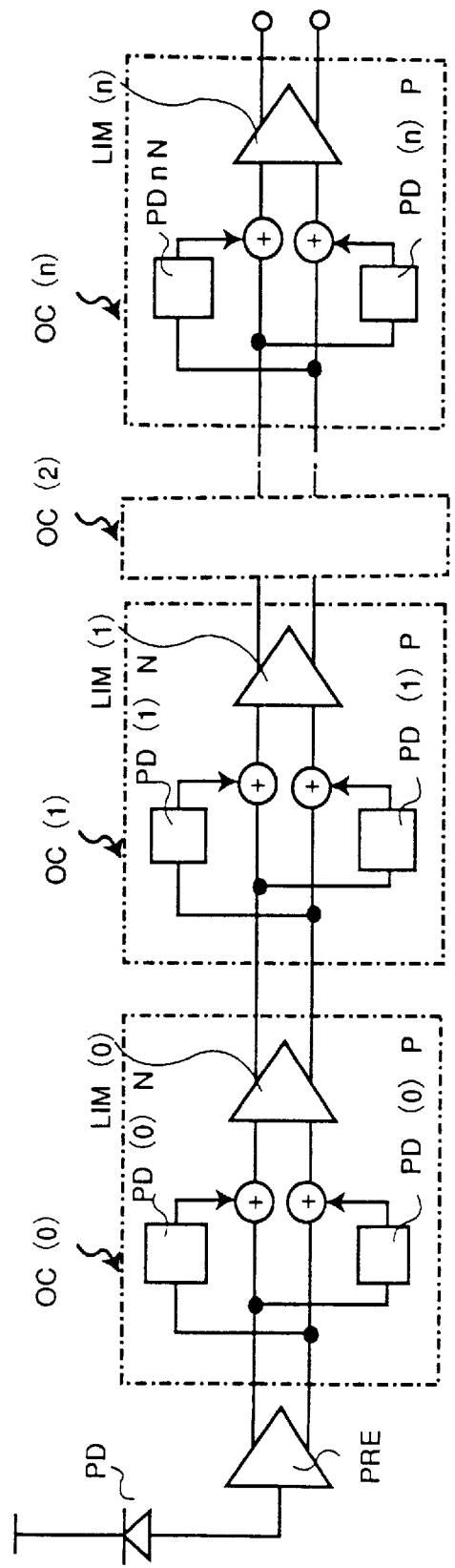
FIG. 4 is a block circuit diagram showing an optical receiving circuit according to a third embodiment of the present invention.

FIG. 4 is a block diagram illustrating an optical receiving circuit according to the third embodiment of the present invention. Elements corresponding to those shown in FIGS. 1 and 2 are designated with the same symbols. In this embodiment, like the first embodiment, both a peak level detecting circuit PD(i)P which detects the peak level of a positive-phase output signal and a peak level detecting circuit PD(i)N which detects the peak level of a negative-phase output signal are prepared as an offset compensating circuit in an amplifying circuit OC(i) at each stage. In this configuration, the peak level of a positive-phase output signal and a negative-phase output signal at the previous stage are detected. Then the detected positive peak level is added to an opposite output signal, that is, to the negative-phase output signal while the detected negative peak level is added to an opposite output signal, that is, to the positive-phase output signal. In this case, as to the time constants τPD(i') and τPD(i')N of the peak level detecting circuits, the time constant set at a previous stage is larger than that set at a following stage. That is, the relationship is expressed by τPD(i')P>τPD(i'+1)P, and τPD(i')N>τPD(i'+1)N.

In the amplifying circuit at each stage according to the third embodiment, the limiter amplifier formed of a differential amplifying circuit amplifies a difference voltage between a positive phase output signal and a negative-phase output signal from an amplifying circuit at the previous stage so that the offset of the output can be compensated. Even in this case, the time constant of the peak level detecting circuit in an amplifying circuit at the previous stage is larger than that of the amplifying circuit at the following stage. Hence, likewise the circuit configurations of the first and second embodiments, even when offset compensation becomes incomplete in the first-stage amplifying circuit, the offset compensating circuit arranged in an amplifying circuit at the following stage can instantaneously performs an offset compensation, thus realizing output characteristics with excellent stability and reliability.

Figure 5:
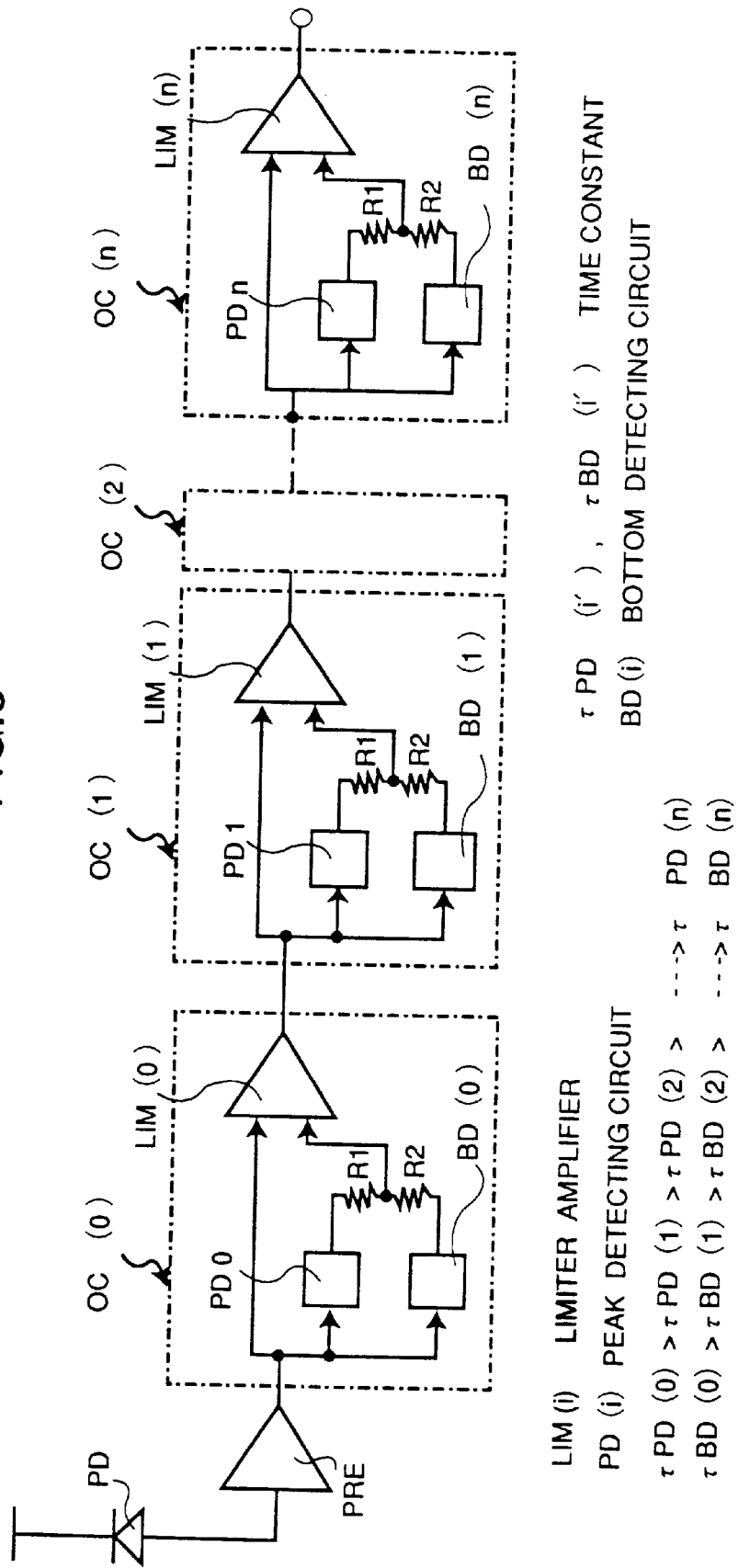
FIG. 5 is a block circuit diagram showing an optical receiving circuit according to a fourth embodiment of the present invention.
Figure 6:
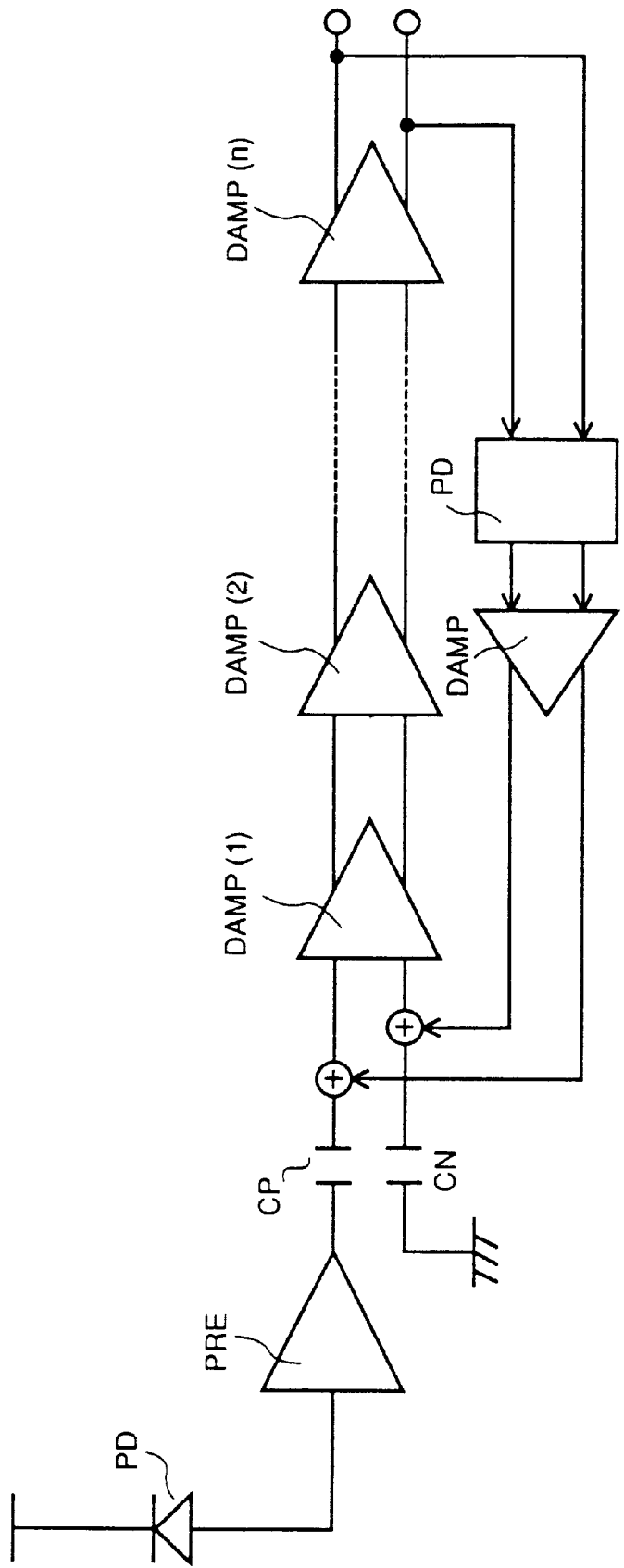
FIG. 6 is a block circuit diagram showing an example of a conventional optical receiving circuit.

FIG. 5 is a block diagram illustrating an optical receiving circuit according to the fourth embodiment of the present invention. This embodiment shows an example of amplifying a unipolar received digital signal in a multistage mode while the polarity is not changed. That is, each of amplifying circuits OC(i) arranged in (n+1) stages is formed of a limiter amplifier LIM(i) acting as a differential amplifier. Only the positive-phase output signal is output to the positive-phase input of an amplifying circuit at the following stage. Both a peak level detecting circuit PD(i) which detects the peak level of an output signal from an amplifying circuit at the previous stage and a bottom level detecting circuit BD(i) which detects the bottom level of an output signal from an amplifying circuit at the previous stage act as an offset compensating circuit in an amplifying circuit at each stage. In the offset compensating circuit, the resistors R1 and R2 divides the outputs from the level detecting circuits to make an intermediate value. The offset compensating circuit outputs the intermediate value as a reference voltage for the limiter amplifying circuit LIM (i) at the following stage. As to the time constant τPD(i') of the peak level detecting circuit PD(i') and the time constant τBD(i') of the bottom level detecting circuit included in an amplifying circuit at each stage, the time constants of level detecting circuits belonging to an amplifying circuit at the previous stage are set to values larger than those of level detecting circuits belonging to an amplifying circuit at the following stage. That is, the relationship is expressed by τPD(i')>τPD(i'+1) and τBD(i')>τBD(i'+1).

In the amplifying circuit at each stage according to the fourth embodiment, offset compensation is achieved by differentially amplifying a voltage difference from a reference voltage obtained as an intermediate value of a peak level and a bottom level and a voltage of a signal output from the previous-stage amplifying circuit by means of the limiter amplifier LIM(i). In this case, the time constant of the peak level detecting circuit and the time constant of the bottom level detecting circuit, which belong to an amplifying circuit at the previous stage, are larger than the time constant of an amplifying circuit at the following stage. Hence, even when offset compensation becomes incomplete in the first-stage amplifying circuit, the offset compensating circuit in the following-stage amplifying circuit can instantaneously complete the offset compensation. This feature allows output characteristics with good stability and reliability to be provided.

As described above, according to the present invention, in the offset compensating circuit arranged in each of a plurality of amplifying circuits successively connected in a multistage form, the time constant in an amplifying circuit arranged at the previous stage is set to a value smaller than the time constant in an amplifying circuit arranged at the following stage. Hence, the time constant of the offset compensating circuit arranged in an amplifying circuit at a previous stage is set to a large value so that the moderated response reduces a possibility of picking up interference. Furthermore, even when offset compensation becomes incomplete due to an erroneous operation of an offset compensating circuit, the small time constant of an offset compensating circuit arranged at the rear stage enables the incomplete offset compensation to be corrected.

In such an operation, the optical receiving circuit can output a received optical signal with excellent stability and reliability. Since the respective amplifying circuits each of which includes an offset compensating circuit have a small feedback loop, the scale of the whole circuit can be reduced. This feature allows the optical receiving circuit to be applied to one-chip IC form.

The entire disclosure of Japanese Patent Application No. 124628/1996 filed on May 20, 1996 including specification, claims, drawing and summary are incorporated herein by reference in its entirety.

What is claimed is:

1. An optical receiving circuit comprising a plurality of amplifying circuits each having an offset compensating function, said plurality of amplifying circuits being successively connected in a multistage form; the time constant of an offset compensating circuit arranged in an amplifying circuit at each stage being set in such a manner that the time constant of an offset compensating circuit in an amplifying circuit at one stage is smaller than that of an offset compensating circuit in an amplifying circuit at the previous stage.

2. The optical receiving circuit of claim 1, wherein said offset compensating circuit comprises a circuit for detecting a peak level of a positive-phase output signal from an amplifying circuit at each stage and a circuit for detecting a peak level of a negative-phase output signal therefrom, and performs a feedback operation to equalize said peak levels detected; the time constant of each of said peak detecting circuits being set in such a manner that the time constant of a peak level detecting circuit in an amplifying circuit at one stage is smaller than that of a peak level detecting circuit in an amplifying circuit at the previous stage.

3. The optical receiving circuit of claim 1, wherein said offset compensating circuit comprises a circuit for detecting an average value of a positive-phase output signal and an average value of a negative-phase output signal from an amplifying circuit at each stage, and then performs a feedback operation to equalize said average values detected; the time constant of said average value detecting circuit being set in such a manner that the time constant of an average detecting circuit in an amplifying circuit at one stage is smaller than that of an average detecting circuit in an amplifying circuit at the previous stage.

4. The optical receiving circuit of claim 1, wherein said offset compensating circuit comprises a circuit for detecting a peak level of a positive-phase output signal from an amplifying circuit at a previous stage and a circuit for detecting a peak level of a negative-phase output signal therefrom; said offset compensating circuit adding said detected peak level of said positive-phase output signal to a negative phase input of an amplifying circuit at a stage including said offset compensating circuit and adding said detected peak level of said negative-phase output signal to a positive-phase input of an amplifying circuit at said stage including said offset compensating circuit; the time constant of each of said peak level detecting circuits being set in such a manner that the time constant of a peak level detecting circuit in an amplifying circuit at one stage is smaller than that of a peak level detecting circuit in an amplifying circuit at the previous stage.

5. An optical receiving circuit of claim 1, wherein said offset compensating circuit comprises a circuit for detecting a peak level of an output signal from an amplifying circuit at a previous stage and a circuit for detecting a bottom level of an output signal therefrom; said compensating circuit differentially amplifying an intermediate value of said peak level and said bottom level detected as a reference input for an amplifying circuit at a stage including said offset compensating circuit; the time constant of said peak level detecting circuit being set in such a manner that the time constant in an amplifying circuit at one stage is smaller than that in an amplifying circuit at the previous stage; the time constant of said bottom level detecting circuit being set in such a manner that the time constant in an amplifying circuit at one stage is smaller than that in an amplifying circuit at the previous stage.

6. An optical receiving circuit comprising;
photo diode for converting an input optical signal into an electrical signal; and
a plurality of amplifying circuits successively connected in a multistage for converting said electrical signal converted by said photo diode into bipolar codes;
said plurality of amplifying circuits respectively including an amplifier and an offset compensating circuit;
said offset compensating circuit including:
a first peak level detecting circuit for detecting a peak level of a positive-phase output signal from said amplifier;
a second peak level detecting circuit for detecting a peak level of a negative-phase output signal from said amplifier; and
a differential amplifier for feeding a differential output signal of said peak level detected by said first peak level detecting circuit back to a positive-phase input and for feeding a differential output signal of said peak level detected by said second peak level detecting circuit back to a negative-phase input, wherein said photo diode is connected to one of the positive-phase and negative-phase inputs of the amplifier of a first one of said amplifying circuits.

7. An optical receiving circuit comprising;
a photo diode for converting an input optical signal into an electrical signal; and
a plurality of amplifying circuits successively connected in a multistage for converting said electrical signal converted by said photo diode into bipolar codes;
said plurality of amplifying circuits respectively including an amplifier and an offset compensating circuit;
said offset compensating circuit including:
a first peak level detecting circuit for detecting a peak level of a positive-phase output signal from said amplifier;
a second peak level detecting circuit for detecting a peak level of a negative-phase output signal from said amplifier; and
a differential amplifier for feeding a differential output signal of said peak level detected by said first peak level detecting circuit back to a positive-phase input and for feeding a differential output signal of said peak level detected by said second peak level detecting circuit back to a negative-phase input, wherein the time constant at each stage is set such that the time constant of an offset compensating circuit arranged at one stage is larger than the time constant of an offset compensating circuit arranged at the following stage.

8. An optical receiving circuit comprising:
a photo diode for converting an input optical signal into an electrical signal; and
a plurality of amplifying circuits successively connected in a multistage for converting said electrical signal converted by said photo diode into bipolar codes;
said plurality of amplifying circuits respectively including an amplifier and an offset compensating circuit;
said offset compensating circuit including:
an average value detecting circuit for detecting a first average value of a positive-phase output signal from said amplifier and a second average value of a negative-phase output signal from said amplifier; and
a differential amplifier for controlling said amplifier using said first and second average values.

9. The optical receiving circuit of claim 8, wherein the time constant at each stage is set such that the time constant of an offset compensating circuit arranged at one stage is larger than the time constant of an offset compensating circuit arranged at the following stage.

10. An optical receiving circuit comprising;

a photo diode for converting an input optical signal into an electrical signal; and a plurality of amplifying circuits successively connected in a multistage for converting said electrical signal converted by said photo diode into bipolar codes;

said plurality of amplifying circuits respectively including an amplifier and an offset compensating circuit;

said offset compensating circuit including:
- a first peak level detecting circuit for detecting a peak level of a positive-phase output signal of one amplifier to add said detected peak level to a negative-phase input signal of the following amplifier; and
- a second peak level detecting circuit for detecting a peak level of a negative-phase output signal of said one amplifier to add said detected peak level to a positive-phase input signal of said following amplifier, wherein the time constant at each stage is set such that the time constant of an offset compensating circuit arranged at one stage is larger than the time constant of an offset compensating circuit arranged at the following stage.

11. An optical receiving circuit comprising:

a photo diode for converting an input optical signal into an electrical signal; and a plurality of amplifying circuits successively connected in a multistage for amplifying a unipolar receive digital signal from said photo diode;

said plurality of amplifying circuits respectively including a limiter amplifier and an offset compensating circuit;

said offset compensating circuit including:
- a peak level detecting circuit for detecting a peak level of an output signal to said amplifier;
- a bottom level detecting circuit for detecting a bottom level of said output signal to said amplifier; and
- a resistance voltage divider for dividing said output signal from said peak level detecting circuit and said output signal from said bottom level detecting circuit to supply an intermediate value as a reference to said limiter amplifier, wherein the time constant of a peak level detecting circuit arranged at one stage is larger than the time constant of a peak level detecting circuit arranged at the following stage; and wherein the time constant of a bottom level detecting circuit arranged at said one stage is larger than the time constant of a bottom level detecting circuit arranged at said following stage.

* * * * *